(12) United States Patent
Satou

(10) Patent No.: US 8,859,653 B2
(45) Date of Patent: Oct. 14, 2014

(54) RUBBER-STEEL CORD COMPOSITE

(75) Inventor: Yoshitaka Satou, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 13/381,567

(22) PCT Filed: Jul. 1, 2010

(86) PCT No.: PCT/JP2010/061228
§ 371 (c)(1),
(2), (4) Date: Dec. 29, 2011

(87) PCT Pub. No.: WO2011/002048
PCT Pub. Date: Jan. 6, 2011

(65) Prior Publication Data
US 2012/0101207 A1    Apr. 26, 2012

(30) Foreign Application Priority Data

Jul. 1, 2009  (JP) .................................. 2009-157153

(51) Int. Cl.
| | | |
|---|---|---|
| C08K 5/098 | (2006.01) | |
| C08K 5/47 | (2006.01) | |
| C08K 3/10 | (2006.01) | |
| C08L 21/00 | (2006.01) | |
| B60C 9/00 | (2006.01) | |
| D07B 1/06 | (2006.01) | |

(52) U.S. Cl.
CPC ............... *C08K 5/098* (2013.01); *B60C 9/0007* (2013.01); *D07B 2205/3089* (2013.01); *B60C 2009/0021* (2013.01); *C08K 5/47* (2013.01); *B60C 2001/0066* (2013.01); *D07B 1/0666* (2013.01)
USPC ................. 524/104; 524/84; 524/80; 524/82; 525/349; 57/232; 152/451; 152/565

(58) Field of Classification Search
CPC ............ C08K 5/098; C08K 5/47; C08K 3/10; C08L 21/00; B60C 9/0007
USPC ........... 525/349; 152/527, 451, 565; 524/424, 524/104, 84, 80, 82; 57/349
See application file for complete search history.

(56) References Cited

U.S. PATENT DOCUMENTS

| | | | |
|---|---|---|---|
| 3,549,650 A | 12/1970 | D'Amico | |
| 2003/0178117 A1 | 9/2003 | Oosawa et al. | |
| 2005/0147818 A1 | 7/2005 | Oosawa et al. | |
| 2008/0009570 A1 | 1/2008 | Miyazaki | |
| 2008/0300368 A1* | 12/2008 | Miyazaki | 525/349 |
| 2009/0229728 A1* | 9/2009 | Kaneda | 152/527 |
| 2011/0034638 A1* | 2/2011 | Satou | 525/349 |

FOREIGN PATENT DOCUMENTS

| | | |
|---|---|---|
| CN | 1457378 A | 11/2003 |
| CN | 101100532 A | 1/2008 |
| EP | 0 179 211 A1 | 4/1986 |
| EP | 0314663 A1 | 5/1989 |
| EP | 1820667 A1 | 8/2007 |
| GB | 1177790 | 1/1970 |
| GB | 1777790 | 1/1970 |
| JP | 5-051491 A | 3/1993 |
| JP | 2004-082878 A | 3/2004 |
| JP | 2004-148986 A | 5/2004 |
| JP | 2005-139082 A | 6/2005 |
| JP | 2005-139239 A | 6/2005 |
| WO | WO 02/066732 A1 | 8/2002 |
| WO | WO 2006/062015 * | 6/2006 |
| WO | WO 2009/084617 * | 9/2009 |

OTHER PUBLICATIONS

Extended European Search Report issued Dec. 4, 2012 in European Application No. 10794216.1 to Bridgestone Corporation.
C.-D. Wacker, et al., "New Sulfenamide Accelerators Derived from 'Safe' Amines for the Rubber and Tyre Industry", IARC Scientific Publications, Lyon, vol. 105, Jan. 1, 1991, pp. 592-594, XP001525568.
Translation of International Preliminary Report on Patentability and Written Opinion mailed Feb. 23, 2012 in International Application No. PCT/JP2010/061228.

* cited by examiner

*Primary Examiner* — James J Seidleck
*Assistant Examiner* — Deve E Valdez
(74) *Attorney, Agent, or Firm* — Sughrue Mion, PLLC

(57) ABSTRACT

Provided is a rubber-steel cord composite which is excellent in workability and which is markedly excellent in tensile characteristics, an adhesive property after vulcanization for a short time and a heat resistant adhesive property. The rubber-steel cord composite has such a constitution that a steel cord which has a brass-plated layer on a peripheral surface thereof and in which a content of phosphorus contained in the form of oxide in a wire surface layer region extending from a surface of the above brass-plated layer up to a depth of 5 nm in a wire radial direction toward the inside is 1.5 atomic % or less is adjacent to a rubber composition containing a rubber component, sulfur and a sulfeneamide base vulcanization accelerator represented by the following Formula (I):

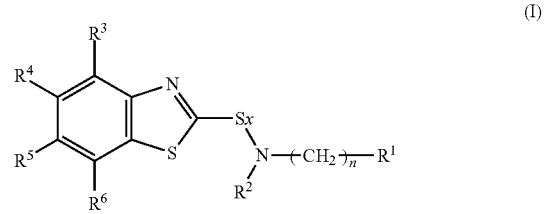

(I)

wherein $R^1$, $R^2$, $R^3$, $R^4$, $R^5$, $R^6$; x and n are as defined in the specification.

9 Claims, No Drawings

RUBBER-STEEL CORD COMPOSITE

CROSS REFERENCE TO RELATED APPLICATIONS

This application is a National Stage of International Application No. PCT/JP2010/061228 filed Jul. 1, 2010, claiming priority based on Japanese Patent Application No. 2009-157153 filed Jul. 1, 2009, the contents of all of which are incorporated herein by reference in their entirety.

TECHNICAL FIELD

The present invention relates to a rubber-steel cord composite, specifically to a rubber-steel cord composite which is improved in workability, an adhesive property between a rubber and a steel cord and the like by using a rubber composition containing a specific sulfeneamide base vulcanization accelerator and a single wire of a steel wire having a smaller content of phosphorus contained in the form of oxide in a brass-plated surface layer region or a steel cord prepared by twisting plural wirers of the above steel wire.

BACKGROUND ART

In rubber products such as belts of radial tires, body plys for carcasses, various industrial belt members, an article prepared by coating a steel wire subjected to brass plating or a steel cord prepared by twisting plural wirers of the above steel wire with a rubber has so far been used to thereby obtain a reinforcing effect thereof. In this case, an adhesive property between the steel cord and the rubber has to be sufficiently secured in order to sufficiently exert the reinforcing effect. From the above viewpoint, a proportion of copper to zinc in brass plating, optimizing a plating thickness and the like are studied, and a certain amount of knowledges has so far been obtained.

In general, a performance required in adhesion of a brass-plated steel cord with a coating rubber does not only demand that an initial adhesive property is good, but various conditions that there are no troubles which originate in deterioration of an adhered interface when rubber products such as tires are exposed to deterioration environment in an actual use and that troubles in a production step of rubber products such as tires are prevented and the compounding cost is kept down have to be satisfied.

Accordingly, the present inventors have proposed a steel wire and a steel cord which are excellent in an adhesive property with rubbers, such as a steel wire for reinforcing rubber products which is provided with a brass-plated layer on a peripheral surface of the wire and in which a content of phosphorus contained in the form of oxide in a wire surface layer region extending from a surface of the brass-plated layer up to a depth of 5 nm in a wire radial direction toward the inside is controlled to 1.5 atomic % or less and a steel cord prepared by twisting plural wires of the above wire (refer to, for example, patent document 1), and further the present inventors have proposed a rubber-steel cord composite comprising a rubber composition which contains 0.1 to 5 parts by weight of a maleimide resin and 0.5 to 8 parts by weight of a bisphenol compound having two tert-butyl groups based on a rubber component containing 50% by weight or more of natural rubber and which is compounded with at least one kind of higher fatty acid and a single wire of a steel wire which has a brass-plated layer on a peripheral surface thereof and in which a content of phosphorus contained in the form of oxide in a wire surface layer region extending from a surface of brass-plated layer up to a depth of 5 nm in a wire radial direction toward the inside is 1.5 atomic % or less or a steel cord prepared by twisting plural wires of the above steel wire (refer to, for example, patent document 2).

The rubber-steel cord composites described in patent documents 1 and 2 can exert the excellent adhesive property than ever before, but the existing situation is that a rubber-steel cord composite which provides better workability and is excellent in an adhesive property between a rubber and a steel cord is eagerly desired to be developed.

On the other hand, high elasticity, low heat build-up, deterioration resistance, an adhesive property and the like are required of rubber compositions such as coating rubbers which are reinforced by a steel cord, and in order to allow the above rubber-steel cord composites to exert particularly a high reinforcing effect and obtain reliability, adhesion which is stable and changed less with the passage of time is required in the rubber-steel cord composites.

Also, when rubber is adhered to metal such as a steel wire, a method in which rubber and metal are bonded at the same time as vulcanization, that is, a direct vulcanization bonding method is known, and in this case, it is considered to be effective in carrying out vulcanization of rubber and bonding of rubber and metal at the same time to use a sulfeneamide base vulcanization accelerator which provides vulcanization reaction with a delayed action.

For example, N,N-dicyclohexyl-2-benzothiazolylsulfeneamide (hereinafter abbreviated as "DCBS") represented by the following formula is known as a vulcanization accelerator which provides vulcanization reaction with the largest delayed action among sulfeneamide base vulcanization accelerators which are commercially available at present:

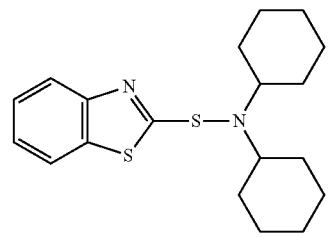 [SMILES: c1ccc2sc(SN(C3CCCCC3)C3CCCCC3)nc2c1]

Also, when a larger delayed action than that of DCBS is required, a vulcanization retardant other than sulfeneamide base vulcanization accelerator is used in combination. N-(cyclohexylthio)phthalimide (hereinafter abbreviated as "CTP") is known as a commercially available representative vulcanization retardant. However, it has been already known that if this CTP is compounded with rubber in a large amount, that exerts an adverse effect on the physical properties of the vulcanized rubber and causes blooming which deteriorates the appearance of the vulcanized rubber and exerts an adverse effect on an adhesive property thereof.

Further, known as sulfeneamide base vulcanization accelerators other than DCBS described above are, for example, bissulfeneamide represented by a specific formula (refer to, for example, patent document 3) and a benzothiazolylsulfeneamide base vulcanization accelerator in which an amine originating in natural oils & fats is used as a raw material (refer to, for example, patent document 4).

However, with respect to the sulfeneamide base vulcanization accelerators described in patent documents 3 and 4, only the rubber physical properties thereof are described, and the adhesion performances are neither described nor suggested.

In addition thereto, it is neither described nor suggested at all that the sulfeneamide compound of the present invention can be used as a novel vulcanization accelerator for rubbers.

Further, several production processes for the sulfeneamide compound used in the present invention are known in, for example, patent documents 5, 6 and 7, but capability of using these compounds as a novel vulcanization accelerator for rubbers and an adhesion performance with a steel cord which is exerted by the above accelerators are neither described nor suggested therein at all.

PRIOR ART DOCUMENTS

Patent Documents

Patent document 1: International Publication No. WO2002/066732 (claims, examples and others)
Patent document 2: Japanese Patent Application Laid-Open No. 2004-82878 (claims, examples and others)
Patent document 3: Japanese Patent Application Laid-Open No. 2005-139239 (claims, examples and others)
Patent document 4: Japanese Patent Application Laid-Open No. 2005-139082 (claims, examples and others)
Patent document 5: Japanese Patent Application Laid-Open No. 2005-139239 (claims, examples and others)
Patent document 6: No. EP0314663A1 (claims, examples and others)
Patent document 7: British Patent No. 1177790 (claims, examples and others)

OUTLINE OF THE INVENTION

Problems to be Solved by the Invention

In light of the conventional problems described above and the like, the present invention intends to solve them, and an object thereof is to provide a rubber-steel cord composite which is markedly decreased in generation of rubber burning and excellent in workability and which is less changed in a compounded rubber with the passage of time to exert a stable adhesive property and which is markedly excellent in an adhesive property between rubber and steel wire or a steel cord by using a rubber composition containing a vulcanization accelerator having a vulcanization retarding effect which is equal to or higher than that of DCBS without using a vulcanization retardant which is likely to bring about problems such as reduction in physical properties of a vulcanized rubber and blooming and a single wire of a steel wire having a smaller content of phosphorus contained in the form of oxide in a brass-plated surface layer region or a steel cord prepared by twisting plural wirers of the above steel wire.

Means for Solving the Problem

Intense studies repeated by the present inventors on the conventional problems described above have resulted in finding that a rubber-steel cord composite which meets the object described above is obtained by using a rubber composition containing a specific sulfeneamide base vulcanization accelerator and a single wire of a steel wire having a smaller content of phosphorus contained in the form of oxide in a brass-plated surface layer region or a steel cord prepared by twisting plural wirers of the above steel wire. Thus, the present invention has come to be completed.

That is, the present invention comprises the following items (1) to (11):

(1) A rubber-steel cord composite characterized in that a steel cord which has a brass-plated layer on a peripheral surface thereof and in which a content of phosphorus contained in the form of oxide in a wire surface layer region extending from a surface of the brass-plated layer up to a depth of 5 nm in a wire radial direction toward the inside is 1.5 atomic % or less is adjacent to a rubber composition containing a rubber component, sulfur and a sulfeneamide base vulcanization accelerator represented by the following Formula (I):

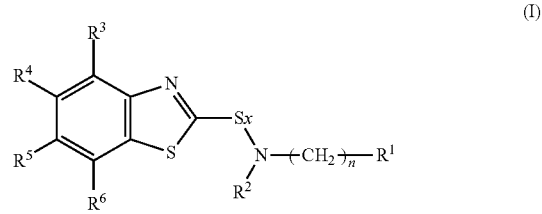

(I)

(wherein $R^1$ is a branched alkyl group having 3 to 12 carbon atoms; $R^2$ is a linear alkyl group having 1 to 10 carbon atoms; $R^3$ to $R^6$ are each a hydrogen atom, a linear alkyl group or alkoxy group having 1 to 4 carbon atoms or a branched alkyl group or alkoxy group having 3 to 4 carbon atoms, and they may be the same or different; x is an integer of 1 or 2, and n is an integer of 0 or 1).

(2) The rubber-steel cord composite as described in the above item (1), wherein 0.3 to 10 parts by mass of sulfur and 0.1 to 10 parts by mass of the sulfeneamide base vulcanization accelerator represented by Formula (I) described above based on 100 parts by mass of the rubber component are contained; a proportion of copper to the total amount of copper and zinc in the whole brass-plated layer is 60 to 70% by mass; and a proportion of copper to the total amount of copper and zinc in the wire surface layer region is 15 to 45 atomic %.

(3) The rubber-steel cord composite as described in the above item (1) or (2), wherein an average thickness of the brass-plated layer is 0.13 to 0.30 µm.

(4) The rubber-steel cord composite as described in any one of the above items (1) to (3), wherein the steel cord is a single wire of a steel wire or prepared by twisting plural wirers of the steel wire.

(5) The rubber-steel cord composite as described in the above item (4), wherein a diameter of the steel wire is 0.40 mm or less.

(6) The rubber-steel cord composite as described in any one of the above items (1) to (5), wherein the rubber composition further contains 0.03 to 3 parts by mass of a cobalt salt of organic acid in terms of a cobalt amount based on 100 parts by mass of the rubber component.

(7) The rubber-steel cord composite as described in any one of the above items (1) to (6), wherein $R^3$ to $R^6$ in Formula (I) are each a hydrogen atom.

(8) The rubber-steel cord composite as described in any one of the above items (1) to (7), wherein in Formula (I), $R^1$ is tert-butyl; n is 0; and $R^2$ is methyl, ethyl or n-propyl.

(9) The rubber-steel cord composite as described in any one of the above items (1) to (8), wherein in Formula (I), $R^1$ is tert-butyl; n is 0, and x is 1; and $R^2$ is methyl, ethyl or n-propyl.

(10) The rubber-steel cord composite as described in any one of the above items (1) to (9), wherein the rubber component contains at least one of natural rubber and polyisoprene rubber.

(11) The rubber-steel cord composite as described in any one of the above items (1) to (10), wherein the rubber component comprises 50% by mass or more of the natural rubber and the balance of a synthetic rubber.

Effects of the Invention

According to the present invention, provided is a rubber-steel cord composite which is excellent in workability and which is markedly excellent in tensile characteristics, an adhesive property after vulcanized for a short time and a heat resistant adhesive property.

MODE FOR CARRYING OUT THE INVENTION

The embodiment of the present invention shall be explained below in detail.

The rubber-steel cord composite of the present invention is characterized in that a steel cord which has a brass-plated layer on a peripheral surface thereof and in which a content of phosphorus contained in the form of oxide in a wire surface layer region extending from a surface of the brass-plated layer up to a depth of 5 nm in a wire radial direction toward the inside is 1.5 atomic % or less is adjacent to a rubber composition containing a rubber component, sulfur and a sulfeneamide base vulcanization accelerator represented by the following Formula (I):

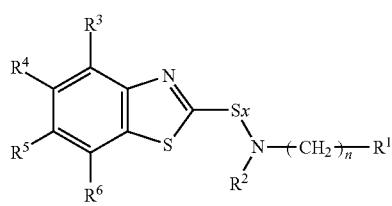

(wherein $R^1$ is a branched alkyl group having 3 to 12 carbon atoms; $R^2$ is a linear alkyl group having 1 to 10 carbon atoms; $R^3$ to $R^6$ are each a hydrogen atom, a linear alkyl group or alkoxy group having 1 to 4 carbon atoms or a branched alkyl group or alkoxy group having 3 to 4 carbon atoms, and they may be the same or different; x is an integer of 1 or 2, and n is an integer of 0 or 1).

The rubber component used in the present invention shall not specifically be restricted as long as it is a rubber used for a rubber-steel cord composite used for tires, industrial belts and the like. Since a rubber component having a double bond in a principal chain can be cross-linked by sulfur, the sulfeneamide base vulcanization accelerator represented by Formula (I) described above functions with it, and a natural rubber and/or a diene base synthetic rubber are used. To be specific, capable of being used is at least one of natural rubbers, polyisoprene rubbers, styrene-butadiene copolymers, polybutadiene rubbers, isoprene rubbers, ethylene-propylene-diene copolymers, chloroprene rubbers, halogenated butyl rubbers, acrylonitrile-butadiene rubbers and the like.

At least one of the natural rubber and the polyisoprene rubber is preferably contained in terms of an adhesive property thereof with the steel wire and the steel cord. Further, more preferably the rubber component comprises 50% by mass or more of the natural rubber, and the balance thereof comprises at least one of the synthetic rubbers described above in terms of better durability of the rubber-steel cord composite.

The sulfeneamide base vulcanization accelerator of the present invention represented by Formula (I) described above has not so far been reported to combine with a cobalt base adhesive, and it has a vulcanization retarding effect equal to that of N,N-dicyclohexyl-2-benzothiazolylsulfeneamide and is excellent in adhesion durability in direct vulcanization bonding with the steel wire and the steel cord. It can suitably be used for a rubber composition for a rubber-steel cord composite used for rubber products having a large thickness and pneumatic tires.

Further, among the sulfeneamide base vulcanization accelerators represented by Formula (I) described above, most preferably used in terms of an adhesive property and a vulcanization retarding effect is the sulfeneamide compound in which $R^1$ is tert-butyl; x is 1 or 2, and n is 0; $R^2$ is preferably a linear alkyl group having 1 to 10 carbon atoms, and among the linear groups, $R^2$ is preferably methyl, ethyl, n-propyl or n-butyl, most preferably methyl or ethyl; and $R^3$ to $R^6$ are each a hydrogen atom. While the above sulfeneamide base vulcanization accelerators have a larger vulcanization retarding effect than that of N,N-dicyclohexyl-2-benzothiazolylsulfeneamide which is known as a vulcanization accelerator providing vulcanization reaction with the largest delayed action among conventional sulfeneamide base vulcanization accelerators, they allow the above effect to be compatible with sufficiently high vulcanization accelerating ability, and in addition thereto, they are excellent in adhesion durability in direct vulcanization bonding with a single wire of a steel wire having a smaller content of phosphorus contained in the form of oxide in a brass-plated surface layer region or a steel cord prepared by twisting plural wirers of the above steel wire. Accordingly, it can be used by adding to a rubber composition which is excellent in adhesion durability in direct vulcanization bonding with a steel wire and a steel cord and which is used for a rubber-steel cord composite that is used for rubber products having a large thickness and a belt layer and a carcass ply layer in pneumatic tires.

In the present invention, $R^1$ in the sulfeneamide compound represented by Formula (I) described above represents a branched alkyl group having 3 to 12 carbon atoms. If $R^1$ is a branched alkyl group having 3 to 12 carbon atoms, a vulcanization accelerating performance of the compound represented by Formula (I) is good, and the adhesion performance thereof can be enhanced.

The specific examples of $R^1$ in the compound represented by Formula (I) include isopropyl, isobutyl, sec-butyl, tert-butyl, isoamyl(isopentyl), neopentyl, tert-amyl(tert-pentyl), isohexyl, tert-hexyl, isoheptyl, tert-heptyl, isooctyl, tert-octyl, isononyl, tert-nonyl, isodecyl, tert-decyl, isoundecyl, tert-undecyl, isododecyl, tert-dodecyl and the like.

Among them, $R^1$ has preferably a branch in an α-position in terms of the vulcanization speed, the adhesive property, the accumulativeness in human bodies and the like, and it is more preferably a tert-alkyl group having 3 to 12 carbon atoms from the viewpoint of such an effect that the suited scorch time is obtained, particularly preferably tert-butyl, tert-amyl (tert-pentyl) and tert-dodecyl. Among them, tert-butyl is economically excellent from the viewpoints of the synthetic aspect and the raw material availability, and it is particularly preferred in terms of providing the vulcanization speed which is equal to that of DCBS (DZ) and the higher adhesive property.

Further, $R^2$ in the sulfeneamide compound represented by Formula (I) described above represents a linear alkyl group having 1 to 10 carbon atoms. If $R^2$ is a linear alkyl group having 1 to 10 carbon atoms, a vulcanization accelerating performance of the compound represented by Formula (I) is good, and the adhesion performance can be enhanced.

The specific examples of $R^2$ in the compound represented by Formula (I) include methyl, ethyl, n-propyl, n-butyl, n-amyl(n-pentyl), n-hexyl, n-heptyl, n-octyl, nonyl, decyl and the like. Among them, it is preferably a linear alkyl group having 1 to 8 carbon atoms, more preferably a linear alkyl group having 1 to 6 carbon atoms in terms of effects such as easiness in the synthesis, the raw material cost, and methyl, ethyl, n-propyl and n-butyl are preferred.

The linear alkyl groups having 1 to 6 carbon atoms are particularly preferred from the viewpoints that the suited Mooney scorch time is obtained and that the steel cord adhesion is good. This is because of the reasons that since the vulcanization is further retarded if the carbon number is increased, the productivity and the adhesive property are reduced. Among the above groups, methyl, ethyl, n-propyl and n-butyl which are the linear alkyl groups having 4 or less carbon atoms are most preferred.

Also, $R^3$ to $R^6$ in the sulfeneamide compound represented by Formula (I) described above are each a hydrogen atom, a linear alkyl group or alkoxy group having 1 to 4 carbon atoms or a branched alkyl group or alkoxy group having 3 to 4 carbon atoms, and they may be the same or different. Above all, $R^3$ and $R^5$ are each preferably a linear alkyl group or alkoxy group having 1 to 4 carbon atoms or a branched alkyl group or alkoxy group having 3 to 4 carbon atoms. Further, when $R^3$ to $R^6$ are each a linear alkyl group or alkoxy group having 1 to 4 carbon atoms, they have preferably one carbon atom, and they are particularly preferably a hydrogen atom. In any of the preferred cases, the compounds are easily synthesized, and the vulcanization speed is not delayed.

The specific examples of $R^3$ to $R^6$ in the sulfeneamide compound represented by Formula (I) include methyl, ethyl, n-propyl, isopropyl, n-butyl, isobutyl, sec-butyl, tert-butyl, methoxy, ethoxy, n-propoxy, isopropoxy, n-butoxy, isobutoxy, sec-butoxy and tert-butoxy.

When both of $R^1$ and $R^2$ in the sulfeneamide compound represented by Formula (I) are branched alkyl groups, difficulty in the synthesis grows larger, and the stable compounds is less liable to be synthesized. In particular, when both of $R^1$ and $R^2$ are tert-butyl, the compounds can not be synthesized well. Further, when both of $R^1$ and $R^2$ are branched alkyl groups, the heat resistant adhesive property is deteriorated, and that is not preferred. In the present invention, $R^1$ in the sulfeneamide compound represented by Formula (I) described above is a branched alkyl group having 3 to 12 carbon atoms, and $R^2$ is a linear alkyl group having 1 to 10 carbon atoms. In the such combination, the nonconventional effects specific to the present invention are exerted.

The particularly preferred combination of $R^1$ and $R^2$ in the sulfeneamide compound represented by Formula (I) is a combination in which $R^1$ is tert-butyl and $R^2$ is a linear alkyl group having 1 to 10 carbon atoms and in which $R^3$ and $R^5$ are hydrogen atoms. In this combination, the combination which is the best mode is a case in which $R^1$ is tert-butyl and in which $R^2$ is methyl, ethyl, n-propyl or n-butyl each having 4 or less carbon atoms, and in a case of a combination in which $R^2$ is more preferably a linear alkyl group having 3 or less carbon atoms, particularly preferably a linear alkyl group having 2 or less carbon atoms, the performance balance is the best from the viewpoints of the vulcanization speed equal to that of DCBS (DZ), securing of the better adhesion performance and the accumulativeness in human bodies.

The combination which is the best mode described above can be confirmed from a numerical value of an octanol/water partition coefficient (log Pow, hereinafter abbreviated as "log P") which is one of simple measures for evaluating a condensation property of chemicals. In the present invention, the smaller the value of log P is, the better the balance between the vulcanization speed, securing of the adhesion performance and the accumulativeness in human bodies is.

In the present invention (including examples and the like described later), the octanol/water partition coefficient (log P) described above can be measured by a high performance liquid chromatography according to JIS Z 7260-117 (2006), and it is defined by the following equation:

$$\log P = \log([Co]/[Cw])$$

Co: concentration of a test substance in a 1-octanol layer
Cw: concentration of a test substance in an aqueous layer The term x in the sulfeneamide compound represented by Formula (I) represents an integer of 1 or 2, and n represents an integer of 0 or 1; and n is preferably 0 in terms of the effects such as easiness in the synthesis and the raw material cost.

Listing up in order the more preferred compounds from the preferred compounds among the sulfeneamide compounds represented by Formula (I) used in the present invention, to be specific, from the viewpoints of preventing the too fast Mooney scorch time, causing no rubber burning in processing and avoiding reduction in the workability and the adhesive property, preferred are 1) the compounds in which in Formula (I), $R^1$ is tert-butyl; n is 0; $R^2$ is a linear alkyl group having 1 to 10 carbon atoms; and $R^3$ to $R^6$ are hydrogen atoms,
2) the compounds in which in Formula (I), $R^1$ is tert-butyl; n is an integer of 0 or 1; $R^2$ is a linear alkyl group having 1 to 6 carbon atoms; and $R^3$ to $R^6$ are each a hydrogen atom,
3) the compounds in which in Formula (I), $R^1$ is tert-butyl; n is 0; $R^2$ is a linear alkyl group having 1 to 6 carbon atoms; and $R^3$ to $R^6$ are each a hydrogen atom,
4) the compounds in which in Formula (I), $R^1$ is tert-butyl; n is 0; $R^2$ is a linear alkyl group having 4 or less carbon atoms (preferably a linear alkyl group having 3 or less carbon atoms); and $R^3$ to $R^6$ are each a hydrogen atom and
5) the compounds in which in Formula (I), $R^1$ is tert-butyl; n is 0; $R^2$ is a linear alkyl group having 2 or less carbon atoms (methyl or ethyl); and $R^3$ to $R^6$ are each a hydrogen atom (the later the order is, the more suitable the sulfeneamide compounds are).

In a case where $R^1$ in the sulfeneamide compound represented by Formula (I) is the respective functional groups other than a branched alkyl group having 3 to 12 carbon atoms (for example, n-octadecyl and the like) or a branched alkyl group having more than 12 carbon atoms, a case where $R^2$ is the respective functional groups other than a linear alkyl group having 1 to 10 carbon atoms (for example, n-octadecyl and the like) and a linear alkyl group having more than 10 carbon atoms, a case where $R^3$ to $R^6$ are the respective functional groups falling outside the ranges described above and fall outside the respective carbon numbers and a case where n is 2 or more, the effects which are the object of the present invention are exerted less; the productivity is reduced or the adhesive property is reduced by delaying of the suited Mooney scorch time and extending of the vulcanization time; or a vulcanization performance of the accelerator and the rubber performances are reduced. Further, when x is 3 or more, that is not preferred in terms of the stability. Also, in a case where $R^1$ in the sulfeneamide compound represented by Formula (I) is a branched alkyl group and where it is the group having branches at position other than an α-position, for example, 2-ethylhexyl, 2-ethylbutyl and the like, a balance between the vulcanization speed, securing of the better adhesion performance and the accumulativeness human bodies tends to be deteriorated, and therefore it has branches preferably at an α-position.

In the present invention, the representative examples of the compound represented by Formula (I) include N-methyl-N-t-butylbenzothiazole-2-sulfeneamide, N-ethyl-N-t-butylbenzothiazole-2-sulfeneamide, N-n-propyl-N-t-butylbenzothiazole-2-sulfeneamide, N-n-butyl-N-t-butylbenzothiazole-2-sulfeneamide, N-methyl-N-isoamylbenzothiazole-2-sulfeneamide, N-ethyl-N-isoamylbenzothiazole-2-sulfeneamide, N-n-propyl-N-isoamylbenzothiazole-2-sulfeneamide, N-n-butyl-N-isoamylbenzothiazole-2-sulfeneamide, N-methyl-N-tert-amylbenzothiazole-2-sulfeneamide, N-ethyl-N-tert-amylbenzothiazole-2-sulfeneamide, N-n-propyl-N-tert-amylbenzothiazole-2-sulfeneamide, N-n-butyl-N-tert-amylbenzothiazole-2-sulfeneamide, N-methyl-N-tert-heptylbenzothiazole-2-sulfeneamide, N-ethyl-N-tert-heptylbenzothiazole-2-sulfeneamide, N-n-propyl-N-tert-heptylbenzothiazole-2-sulfeneamide, N-n-butyl-N-tert-heptylbenzothiazole-2-sulfeneamide and the like. The above compounds can be used alone or in a mixture of two or more kinds thereof (in the present specification, hereinafter referred to merely as "at least one kind").

N-methyl-N-t-butylbenzothiazole-2-sulfeneamide, N-ethyl-N-t-butylbenzothiazole-2-sulfeneamide and N-n-propyl-N-t-butylbenzothiazole-2-sulfeneamide are preferred from the viewpoint of the better adhesive performance.

Among them, N-methyl-N-t-butylbenzothiazole-2-sulfeneamide, N-ethyl-N-t-butylbenzothiazole-2-sulfeneamide and N-n-propyl-N-t-butylbenzothiazole-2-sulfeneamide are particularly preferably used in terms of having the longest scorch time and the excellent adhesive property.

The above compounds may be used alone or in combination. Further, they can be used in combination with general purpose vulcanization accelerators such as N-t-butyl-2-benzothiazolesulfeneamide (TBBS), N-cyclohexyl-2-benzothiazolesulfeneamide (CBS), dibenzothiazolyl disulfide (MTBS).

The following process can be listed as a preferred production process for the sulfeneamide compound represented by Formula (I) in the present invention.

That is, N-chloroamine prepared in advance by reaction of a corresponding amine and sodium hypochlorite is reacted with bis(benzothiazole-2-yl) disulfide in a suited solvent under the presence of the amine and a base. When an amine is used as the base, the reaction solution is neutralized to isolate the free amine, and then the reaction mixture obtained is subjected to suited after-treatments such as filtering, washing with water, concentration and recrystallization according to the properties thereof to obtain the targeted sulfeneamide.

The base used in the present production process includes the raw material amine used in an excessive amount, tertiary amine such as triethylamine, alkali hydroxide, alkali carbonate, alkali bicarbonate, sodium alkoxide. In particular, preferred is a process in which reaction is carried out by using the excess raw material amine as the base or triethylamine of a tertiary amine and in which resulting hydrochloride is neutralized by sodium hydroxide to take out the targeted product, followed by recovering the amine from the filtrate and reusing.

Alcohols are preferred as the solvent used in the present production process, and methanol is particularly preferred.

In a case of, for example, N-ethyl-N-t-butylbenzothiazole-2-sulfeneamide, a sodium hypochlorite aqueous solution is dropwise added to N-t-butylamine at 0° C. or lower and stirred for 2 hours, and the oil layer is separated. Bis(benzothiazole-2-yl) disulfide, N-t-butylethylamine and the above oil layer are suspended in methanol and stirred under refluxing for 2 hours. After cooled down, the solution is neutralized by sodium hydroxide, filtered, washed with water, concentrated under reduced pressure and then recrystallized, whereby targeted BEBS (white crystal) can be obtained.

A content of the above sulfeneamide base vulcanization accelerators is 0.1 to 10 parts by mass, preferably 0.5 to 5.0 parts by mass and more preferably 0.8 to 2.5 parts by mass based on 100 parts by mass of the rubber component.

If a content of the above sulfeneamide base vulcanization accelerators is less than 0.1 part by mass, the vulcanization is not sufficiently carried out, and on the other hand, if it exceeds 10 parts by mass, a problem of blooming is brought about. Accordingly, both ranges are not preferred.

Sulfur used in the present invention is a vulcanizing agent, and a content thereof is 0.3 to 10 parts by mass, preferably 1.0 to 7.0 parts by mass and more preferably 3.0 to 7.0 parts by mass based on 100 parts by mass of the rubber component.

If a content of the above sulfur is less than 0.3 part by mass, the vulcanization is not sufficiently carried out, and on the other hand, if it exceeds 10 parts by mass, an anti-aging performance of the rubber is reduced. Accordingly, both ranges are not preferred.

Further, cobalt (elemental substance) and/or a compound containing cobalt are preferably added to the rubber composition of the present invention in terms of enhancing an initial adhesion performance.

The compound containing cobalt which can be used includes at least one of cobalt salts of organic acids and cobalt chloride, cobalt sulfate, cobalt nitrate, cobalt phosphate and cobalt chromate which are cobalt salts of inorganic acids.

The cobalt salts of organic acids are preferably used in terms of further enhancing the initial adhesion performance.

The cobalt salts of organic acids which can be used include, for example, at least one of cobalt naphtenate, cobalt stearate, cobalt neodecanoate, cobalt rhodinate, cobalt versatate, a cobalt salt of tall oil acid and the like. Also, a cobalt salt of organic acid may be a complex salt in which a part of the organic acid is substituted with boric acid, and to be specific, a trade name "Manobond" manufactured by OMG Corporation which is commercially available can be used as well.

A (total) content of the above cobalt and/or the compound containing cobalt is 0.03 to 3 parts by mass, preferably 0.03 to 1 part by mass and more preferably 0.05 to 0.7 part by mass in terms of a cobalt amount based on 100 parts by mass of the rubber component.

If a content of the above cobalt amounts is less than 0.03 part by mass, the adhesive property can not be further exerted, and on the other hand, if it exceeds 3 parts by mass, the aged physical properties deteriorate to a large extent. Accordingly, both ranges are not preferred.

In addition to the rubber component, sulfur, the sulfeneamide base vulcanization accelerator represented by Formula (I), the cobalt compound and the like each described above, compounding ingredients which are usually used for rubber products such as tires, conveyor belts can be used for the rubber composition of the present invention as long as the effects of the present invention are not damaged. For example, an inorganic filler such as carbon black, silica, a softening agent, an age resister and the like can suitably be compounded according to the uses.

In the steel cord according to the present invention, a content of phosphorus contained in the form of oxide in a wire surface layer region extending from a surface of a peripheral surface brass-plated layer up to a depth of 5 nm in a wire radial direction toward the inside has to be controlled to 1.5 atomic % or less. If a content of the phosphorus is increased in excess of 1.5 atomic %, an adhesion rate of the steel cord with the rubber is delayed as it is increased. Controlling the content of the phosphorus to 1.5 atomic % or less makes it possible to obtain stably the excellent rubber adhesive property regardless of a moisture content in the rubber.

In this regard, in the present invention (including examples and the like described later), phosphorus in the wire surface layer region of the brass-plated layer is quantitatively determined by measuring an atomicity of atoms present in the wire surface layer region of the plated layer, that is, C, Cu, Zn, O, P and N by using an X ray photoelectron spectroscopy in an analysis area of 20 to 30 μmϕ so that an influence of a curvature of the wire is not exerted, and a content of the phosphorus is determined in terms of a proportion of an atomicity of P, wherein the total atomicity of C, Cu, Zn, O, P and N is set to 100. The atomicities of the respective atoms are determined by using the counted numbers of the photoelectrons of C: $C_{1S}$, O: $O_{1S}$, P: $P_{2P}$, Cu: $Cu_{2P3/2}$, Zn: $Zn_{2P3/2}$ and N: $N_{1S}$ respectively to correct them by the respective sensitivity coefficients. For example, a detected atomicity [P] of the phosphorus can be determined according to the following equation:

$$[P] = F_P(\text{sensitivity coefficient of } P_{2P}) \times (\text{counted number of } P_{2P} \text{ photoelectron per fixed time})$$

The detected atomicities of the other atoms are determined in the same manner, and a relative atomic % of the phosphorus can be determined from the results thereof according to the following equation:

$$P(\text{atomic \%}) = \{[P]/([Cu]+[Zn]+[C]+[O]+[N]+[P])\} \times 100$$

Further, the distribution of the elements in a depth direction from a peripheral surface to a wire radial direction toward the inside can be measured in detail by carrying out argon etching and the like.

When the wire before the analysis described above is coated with oil and the like or contaminated by organic substances, the surface of the wire has to be washed by a suitable solvent in order to carry out the accurate analysis and subjected further, if necessary, to dry cleaning of such a light degree that the surface is not modified.

In order to control an amount of the phosphorus contained in the form of oxide in the wire surface layer region described above to 1.5 atomic % or less, a path schedule of wire drawing processing, a form and an angle of entrance and approach of a die, a material of the die and a composition of a lubricant are controlled alone or in suited combination respectively, whereby the above amount of the phosphorus is suitably controlled. In particular, it is very effective in the final wire drawing step to use a lubricant containing an extreme-pressure additive in the same manner as usual and apply a die having an excellent self lubricity in combination with an excellent cutting property, for example, a sintered diamond die in the final path or several paths of a later stage including the final path out of approximately 20 paths in a die in the final wire drawing step to carry out wire drawing processing.

An average thickness of the brass-plated layer is suitably 0.13 to 0.30 μm. If an average thickness of the brass-plated layer is less than 0.13 μm, a part in which an iron base is exposed is increased, and the initial adhesive property is disturbed. On the other hand, if it exceeds 0.30 μm, the adhesion reaction proceeds excessively by heat generated during using the rubber product, and only the weak adhesion is obtained.

In the present invention, a proportion of copper to the total amount of copper and zinc in the whole brass-plated layer is preferably 60 to 70% by mass, and a proportion of copper to the total amount of copper and zinc in the wire surface layer region is preferably 15 to 45 atomic %. If a proportion of copper to the total amount of copper and zinc in the whole brass-plated layer is less than 60% by mass, the wire drawing property deteriorates, and the productivity is inhibited by breaking of the wire to make it difficult to produce the product in a large amount. In addition thereto, it is difficult to control a content of copper in the wire surface layer region to 15 atomic % or more. On the other hand, if it exceeds 70% by mass, the heat resistant adhesive property and the moisture resistant adhesive property are reduced, and the tire can not maintain satisfactory durability against environment to which the tire is exposed. In addition thereto, it is difficult to control a content of copper in the wire surface layer region to 45 atomic % or less. Further, if a proportion of copper to the total amount of copper and zinc in the wire surface layer region is less than 15 atomic %, the wire is poor in adhesion reaction with the rubber even when an amount of phosphorus in the wire surface layer region is limited to 1.5 atomic % or less described above to result in making it difficult to secure the excellent rubber adhesive property. On the other hand, if it exceeds 45 atomic %, the disadvantage that the heat resistant adhesive property and the moisture resistant adhesive property are reduced is brought about.

Further, a diameter of the steel wire is preferably 0.40 mm or less. If the diameter exceeds 0.40 mm, a surface distortion of the rubber product used is increased when distortion is exerted repeatedly thereon under bending deformation, and buckling is liable to be brought about.

The steel wire used in the present invention may be used in the form of a single wire, and it can be used in the form of a steel cord prepared by twisting plural wirers. They are suited as a reinforcing material for rubber products, especially carcasses and belts of tires. In particular, when the rubber-steel cord composite of the present invention is applied to belts of tires for passenger cars, especially radial tires for passenger cars, an adhesion speed thereof with the rubber is accelerated, whereby the effect that a vulcanization time of the tire can be shortened to a large extent can be obtained as well. On the other hand, when it is applied to carcasses of tires for trucks and bases, especially radial tires for trucks and bases, an adhesion speed thereof with the rubber in the bead part is accelerated, and therefore improvement in durability of the bead part as well as shortening of a vulcanization time of the tire can be achieved.

The rubber-steel cord composite of the present invention is constituted from the rubber composition for coating a steel cord which contains the specific sulfeneamide base vulcanization accelerator described above and the specific steel cord, and the thus constituted rubber-steel cord composite in which the steel cord is adjacent to the rubber composition is suitably used as a reinforcing material for enhancing the performances of industrial rubber products such as tires for cars, conveyor belts. When the rubber-steel cord composite of the present invention is used for pneumatic tires, for example, in tires in which a carcass extending in the form of a toroid between a pair of beads is a skeleton and a belt is provided in an outside thereof in a tire radial direction, any of the foregoing rubber-steel cord composites of the present invention is used for any one or both of the above carcass and the belt, and that makes it possible to obtain high performance pneumatic tires which are excellent in durability.

In the present invention thus constituted, the rubber composition containing the vulcanization accelerator which has a vulcanization retarding effect equal to or higher than that of DCBS and which has heat deterioration resistance without using a vulcanization retardant which is likely to bring about problems such as reduction in the physical properties of the vulcanized rubber, blooming is used as a coating rubber for steel cords having a low phosphorus amount in which a content of phosphorus disturbing adhesion reaction is small, and therefore obtained is the rubber-steel cord composite which is reduced markedly in rubber burning and in which the compounded rubber is less changed with the passage of time and excellent markedly in an adhesive property (an adhesive property after vulcanized for a short time, a heat resistant adhesive property) with a steel cord and the like while maintaining processability of the rubber composition and a high heat resistant adhesive property. Also, from the rubber composition further containing cobalt (single substance) and/or a compound containing cobalt, obtained is the rubber-steel cord composite which is excellent in adhesion durability between the rubber and a steel cord and the like and which is used for rubber products such as tires, industrial belts.

EXAMPLES

Next, the present invention shall be explained in further details based on production examples 1 to 6 for the vulcanization accelerators represented by Formula (I) which are used in the present invention, examples for the rubber-steel cord composites of the present invention and comparative examples, but the present invention shall by no means be restricted to the above production examples and examples.

Also, the octanol/water partition coefficients (log P) of the respective vulcanization accelerators obtained (production examples 1 to 6) were measured by a high performance liquid chromatography according to JIS Z 7260-117 (2006). A high performance liquid chromatography manufactured by Shimadzu Corporation was used.

Production Example 1

Synthesis of
N-ethyl-N-t-butylbenzothiazole-2-sulpheneamide

A 12% sodium hypochlorite aqueous solution 148 g was dropwise added to N-t-butylethylamine 16.4 g (0.162 mol) at 0° C. or lower and stirred for 2 hours, and then the oil layer was obtained by separation. Bis(benzothiazole-2-yl)disulfide 39.8 g (0.120 mol), N-t-butylethylamine 24.3 g (0.240 mol) and the above oil layer were suspended in 120 ml of methanol and stirred under refluxing for 2 hours. After cooled, the solution was neutralized by 6.6 g (0.166 mol) of sodium hydroxide, filtered, washed with water and concentrated under reduced pressure, and then the concentrate was recrystallized to thereby obtain 41.9 g (yield: 66%) of targeted N-ethyl-N-t-butylbenzothiazole-2-sulpheneamide in the form of white solid (melting point: 60 to 61° C.)

The spectral data of N-ethyl-N-t-butylbenzothiazole-2-sulpheneamide thus obtained is shown below.

$^1$H-NMR (400 MHz, CDCl$_3$) δ=1.29 (t, 3H, J=7.1 Hz, CH$_3$ (ethyl)), 1.34 (s, 9H, CH$_3$ (t-butyl)), 2.9 to 3.4 (br-d, CH$_2$), 7.23 (1H, m), 7.37 (1H, m), 7.75 (1H, m), 7.78 (1H, m):

$^{13}$C-NMR (100 MHz, CDCl$_3$) δ=15.12, 28.06, 47.08, 60.41, 120.70, 121.26, 123.23, 125.64, 134.75, 154.93, 182.63:

Mass spectrometry (EI, 70 eV): m/z; 251 (M$^+$-CH$_4$), 167 (M$^+$-C$_6$H$_{14}$N), 100 (M$^+$-C$_7$H$_5$NS$_2$):

IR (KBr, cm$^{-1}$): 3061, 2975, 2932, 2868, 1461, 1429, 1393, 1366, 1352, 1309, 1273, 1238, 1198, 1103, 1022, 1011, 936, 895, 756, 727.

An octanol/water partition coefficient (log P) of N-ethyl-N-t-butylbenzothiazole-2-sulpheneamide was 4.9.

Production Example 2

Synthesis of
N-methyl-N-t-butylbenzothiazole-2-sulpheneamide

N-t-butylmethylamine 14.1 g (0.162 mol) was used in place of N-t-butylethylamine to carry out the reaction in the same manner as in Production Example 1, and 46.8 g (yield: 82%) of N-methyl-N-t-butylbenzothiazole-2-sulpheneamide was obtained in the form of white solid (melting point: 56 to 58° C.)

$^1$H-NMR (400 MHz, CDCl$_3$) δ=1.32 (9H, s, CH$_3$ (t-butyl)), 3.02 (3H, s, CH$_3$ (methyl)), 7.24 (1H, m), 7.38 (1H, m), 7.77 (1H, m), 7.79 (1H, m):

$^{13}$C-NMR (100 MHz, CDCl$_3$) δ=27.3, 41.9, 59.2, 120.9, 121.4, 123.3, 125.7, 135.0, 155.5, 180.8:

Mass spectrometry (EI, 70 eV): m/z; 252 (M$^+$), 237 (M$^+$-CH$_3$), 223 (M$^+$-C$_2$H$_6$), 195 (M$^+$-C$_4$H$_9$), 167 (M$^+$-C$_5$H$_{12}$N), 86 (M$^+$-C$_7$H$_4$NS$_2$).

An octanol/water partition coefficient (log P) of N-methyl-N-t-butylbenzothiazole-2-sulpheneamide was 4.5.

Production Example 3

Synthesis of
N-n-propyl-N-t-butylbenzothiazole-2-sulpheneamide

N-n-propyl-t-butylamine 18.7 g (0.162 mol) was used in place of N-t-butylethylamine to carry out the reaction in the same manner as in Production Example 1, and N-n-propyl-N-t-butylbenzothiazole-2-sulpheneamide was obtained in the form of white solid (melting point: 50 to 52° C.)

$^1$H-NMR (400 MHz, CDCl$_3$) δ=0.92 (t, J=7.3 Hz, 3H), 1.34 (s, 9H), 1.75 (br, 2H), 3.03 (brd, 2H), 7.24 (t, J=7.0 Hz, 1H), 7.38 (t, J=7.0 Hz, 1H), 7.77 (d, J=7.5 Hz, 1H), 7.79 (d, J=7.5 Hz, 1H).

$^{13}$C-NMR (100 MHz, CDCl$_3$) δ=11.7, 23.0, 28.1, 55.3, 60.4, 120.7, 121.3, 123.3, 125.7, 134.7, 154.8, 181.3.

An octanol/water partition coefficient (log P) of N-n-propyl-N-t-butylbenzothiazole-2-sulpheneamide was 5.3.

Production Example 4

Synthesis of
N-1-propyl-N-t-butylbenzothiazole-2-sulpheneamide

N-i-propyl-t-butylamine 18.7 g (0.162 mol) was used in place of N-t-butylethylamine to carry out the reaction in the same manner as in Production Example 1, and N-i-propyl-N-t-butylbenzothiazole-2-sulpheneamide was obtained in the form of white solid (melting point: 68 to 70° C.)

$^1$H-NMR (400 MHz, CDCl$_3$) δ=1.20 to 1.25 (dd, (1.22 ppm: J=6.4 Hz, 1.23 ppm: J=6.4 Hz) 6H), 1.37 (s, 9H), 3.78 (m, J=6.3 Hz, 1H), 7.23 (t, J=7.0 Hz, 1H), 7.38 (t, J=7.0 Hz, 1H), 7.77 (d, J=7.5 Hz, 1H), 7.79 (d, J=7.5 Hz, 1H).

$^{13}$C-NMR (100 MHz, CDCl$_3$) δ=22.3, 23.9, 29.1, 50.6, 61.4, 120.6, 121.2, 123.2, 125.6, 134.5, 154.5, 183.3.

An octanol/water partition coefficient (log P) of N-i-propyl-N-t-butylbenzothiazole-2-sulpheneamide was 5.1.

Production Example 5

Synthesis of
N,N-di-i-propylbenzothiazole-2-sulpheneamide

N-di-i-propylamine 16.4 g (0.162 mol) was used in place of N-t-butylethylamine to carry out the reaction in the same manner as in Production Example 1, and N,N-di-i-propylbenzothiazole-2-sulpheneamide was obtained in the form of white solid (melting point: 57 to 59° C.)

$^1$H-NMR (400 MHz, CDCl$_3$) 1.26 (d, J=6.5 Hz, 12H), 3.49 (dq, J=6.5 Hz, 2H), 7.24 (t, J=7.0 Hz, 1H), 7.37 (t, J=7.0 Hz, 1H), 7.75 (d, J=8.6 Hz, 1H), 7.79 (d, J=8.6 Hz, 1H).

$^{13}$C-NMR (100 MHz, CDCl$_3$) 21.7, 22.5, 55.7, 120.8, 121.3, 123.4, 125.7, 134.7, 155.1, 182.2.

Mass spectrometry (EI, 70 eV): m/z; 266 (M$^+$), 251 (M$^+$-15), 218 (M$^+$-48), 209 (M$^+$-57), 182 (M$^+$-84), 167 (M$^+$-99), 148 (M$^+$-118), 100 (M$^+$-166: base).

Production Example 6

Synthesis of
N-n-butyl-N-t-butylbenzothiazole-2-sulpheneamide

N-t-butyl-n-butylamine 20.9 g (0.162 mol) was used in place of N-t-butylethylamine to carry out the reaction in the same manner as in Production Example 1, and 42.4 g (yield: 60%) of N-n-butyl-N-t-butylbenzothiazole-2-sulpheneamide was obtained in the form of white solid (melting point: 55 to 56° C.)

$^1$H-NMR (400 MHz, CDCl$_3$) δ=0.89 (3H, J=7.32 Hz, CH$_3$ (n-Bu)), 1.2 to 1.4 (s+m, 11H, CH$_3$ (t-butyl)+CH$_2$ (n-butyl)), 1.70 (br, s, 2H, CH$_2$), 2.9 to 3.2 (br, d, 2H, N—CH$_2$), 7.23 (1H, m), 7.37 (1H, m), 7.75 (1H, m), 7.78 (1H, m);

$^{13}$C-NMR (100 MHz, CDCl$_3$) δ: 14.0, 20.4, 27.9, 31.8, 53.0, 60.3, 120.6, 121.1, 123.1, 125.5, 134.6, 154.8, 181.2;

Mass spectrometry (EI, 70 eV): m/z; 294 (M$^+$), 279 (M$^+$-CH$_3$), 237 (M$^+$-C$_4$H$_9$), 167 (M$^+$-C$_8$H$_{18}$N), 128 (M$^+$-C$_7$H$_4$NS$_2$):

IR (neat): 1707 cm$^{-1}$, 3302 cm$^{-1}$.

An octanol/water partition coefficient (log P) of N-n-butyl-N-t-butylbenzothiazole-2-sulpheneamide was 5.8.

Examples 1 to 4 and Comparative Examples 1 to 12

Rubber components, sulfur, a vulcanization accelerator obtained in the production examples described above, a cobalt salt of organic acid and other compounding ingredients were kneaded and mixed according to recipes shown in the following Table 1 by means of a Banbury mixer of 2200 ml to prepare unvulcanized rubber compositions, and a Mooney viscosity, a Mooney scorch time, an elongation (Eb) and a stress (Tb) in breaking and a tensile stress (M300) in 300% elongation thereof were evaluated by the following methods.

Next, the respective rubber compositions obtained above were coated on steel cords and vulcanized under the following conditions to obtain rubber-steel cord composites, and an adhesive property after vulcanized for a short time and a heat resistant adhesive property of the rubber-steel cord composites obtained in the respective examples and comparative examples were evaluated by an adhesion test according to the following methods. The results thereof are shown in the following Table 1.

The steel cords used were a steel cord A (a content of phosphorus contained in the form of oxide in a wire surface layer region extending from a surface of a brass-plated layer up to a depth of 5 nm in a wire radial direction toward the inside: 2.5 atomic %) plated by brass of Cu: 63% by weight and Zn: 37% by weight and a steel cord B (the above content: 1.0 atomic %). A content of phosphorus contained in the form of oxide in a wire surface layer region extending from a surface of the brass-plated layer up to a depth of 5 nm in a wire radial direction toward the inside was measured while carrying out argon-etching.

Evaluation Methods of Mooney Viscosity and Mooney Scorch Time:

Measured according to JIS K 6300-1: 2001.

In the evaluation, the values were shown by indices, wherein the value in Comparative Example 7 was set to 100. It is shown that the smaller the value of the Mooney viscosity is, the better the workability is, and it is shown that the larger the value of the Mooney scorch time is, the better the workability is.

Evaluation Method of Tensile Characteristics:

The rubber compositions obtained above were vulcanized at 145° C. for 60 minutes to obtain vulcanized rubbers, and they were subjected to measuring tests at 25° C. according to JIS K 6301: 1995 (No. 3 type test piece) to measure an elongation (Eb) and a stress (Tb) in breaking and a tensile stress (M300) in 300% elongation, and the values were shown by indices, wherein a tensile stress of the rubber composition prepared in Comparative Example 7 was set to 100. It is shown that the larger the values are, the better the tensile characteristics are.

Adhesion Test: Adhesive Property after Vulcanized for a Short Time and Heat Resistant Adhesive Property:

The brass-plated steel cords (1×3 structure, wire diameter: 0.30 mm) were arranged parallel at an interval of 30 wires/inch, and the above steel cords were coated from both sides with the rubber compositions (compositions shown in the following Table 1) to prepare samples.

The respective samples were subjected to an adhesion test according to ASTM D-2229. In a case of the adhesive property after vulcanized for a short time, the respective samples were vulcanized under the condition of 160° C.×7 minutes, and then the steel cords of the rubber-steel cord composites were drawn out from the rubbers by the test method described above to visually observe a coated state of the rubber. The state was shown by 0 to 100% as an index of the adhesive property after vulcanized for a short time. It is shown that the larger the numerical value is, the better the adhesive property after vulcanized for a short time is.

Further, in a case of the heat resistant adhesive property, the respective samples were left standing for 15 days and 30 days in a gear oven of 100° C., and then the steel cords were drawn out by the test method described above to visually observe a coated state of the rubber. The state was shown by 0 to 100% as an index of the heat resistant adhesive property. It is shown that the larger the numerical value is, the better the heat resistant adhesive property is.

TABLE 1

|  | Example | | | | Comparative Example | | | | | | | | | | | |
| --- | --- | --- | --- | --- | --- | --- | --- | --- | --- | --- | --- | --- | --- | --- | --- | --- |
|  | 1 | 2 | 3 | 4 | 1 | 2 | 3 | 4 | 5 | 6 | 7 | 8 | 9 | 10 | 11 | 12 |
| Cord layer | B | B | B | B | A | A | A | A | A | A | A | A | B | B | B | B |
| Natural rubber | 100 | 100 | 100 | 100 | 100 | 100 | 100 | 100 | 100 | 100 | 100 | 100 | 100 | 100 | 100 | 100 |
| HAF carbon black | 60 | 60 | 60 | 60 | 60 | 60 | 60 | 60 | 60 | 60 | 60 | 60 | 60 | 60 | 60 | 60 |
| Zinc oxide | 8 | 8 | 8 | 8 | 8 | 8 | 8 | 8 | 8 | 8 | 8 | 8 | 8 | 8 | 8 | 8 |
| Age resister*1 | 2 | 2 | 2 | 2 | 2 | 2 | 2 | 2 | 2 | 2 | 2 | 2 | 2 | 2 | 2 | 2 |

TABLE 1-continued

| | Example | | | | Comparative Example | | | | | | | | | | | |
|---|---|---|---|---|---|---|---|---|---|---|---|---|---|---|---|---|
| | 1 | 2 | 3 | 4 | 1 | 2 | 3 | 4 | 5 | 6 | 7 | 8 | 9 | 10 | 11 | 12 |
| Vulcanization accelerator 1 DCBS*2 | | | | | | | | | | | 1 | | | | 1 | |
| Vulcanization accelerator 2 CBS*3 | | | | | | | | | | | | 1 | | | | 1 |
| Sulfur | 5 | 5 | 5 | 5 | 5 | 5 | 5 | 5 | 5 | 5 | 5 | 5 | 5 | 5 | 5 | 5 |
| Cobalt salt of fatty acid*4 | 1 | 1 | 1 | 1 | 1 | 1 | 1 | 1 | 1 | 1 | 1 | 1 | 1 | 1 | 1 | 1 |
| Novel vulcanization accelerator 1*5 | 1 | | | | 1 | | | | | | | | | | | |
| Novel vulcanization accelerator 2*6 | | 1 | | | | 1 | | | | | | | | | | |
| Novel vulcanization accelerator 3*7 | | | 1 | | | | 1 | | | | | | | | | |
| Novel vulcanization accelerator 4*8 | | | | | | | | 1 | | | | | 1 | | | |
| Novel vulcanization accelerator 5*9 | | | | | | | | | 1 | | | | | 1 | | |
| Novel vulcanization accelerator 6*10 | | | | 1 | | | | | | 1 | | | | | | |
| Mooney viscosity (ML$_{1+4}$) | 94 | 95 | 95 | 95 | 95 | 95 | 95 | 100 | 101 | 95 | 100 | 100 | 100 | 102 | 100 | 100 |
| Mooney scorch time (t$_3$) | 104 | 110 | 110 | 113 | 105 | 110 | 110 | 115 | 114 | 112 | 100 | 70 | 116 | 114 | 100 | 70 |
| Evaluation of tensile characteristics Eb | 97 | 99 | 95 | 100 | 98 | 99 | 96 | 99 | 92 | 100 | 100 | 104 | 99 | 92 | 100 | 104 |
| Evaluation of tensile characteristics Tb | 103 | 105 | 101 | 102 | 104 | 105 | 100 | 98 | 94 | 102 | 100 | 100 | 97 | 94 | 100 | 100 |
| Evaluation of tensile characteristics M300 | 101 | 104 | 102 | 103 | 102 | 104 | 101 | 99 | 96 | 103 | 100 | 99 | 99 | 98 | 100 | 99 |
| Adhesive property after vulcanized for short time (%) | 100 | 100 | 100 | 100 | 20 | 20 | 20 | 15 | 15 | 20 | 20 | 30 | 90 | 90 | 80 | 100 |
| Heat resistant adhesive property (%) 15 days deterioration | 95 | 95 | 90 | 85 | 90 | 90 | 85 | 65 | 60 | 80 | 70 | 60 | 70 | 65 | 80 | 70 |
| Heat resistant adhesive property (%) 30 days deterioration | 65 | 70 | 60 | 60 | 60 | 60 | 55 | 35 | 30 | 55 | 40 | 20 | 40 | 35 | 50 | 30 |

*1 to *10 in Table 1 shown above mean the followings.
*1N-phenyl-N'-1,3-dimethylbutyl-p-phenylenediamine (trade name: Nocceler 6C manufactured by Ouchi Shinko Chemical Industrial Co., Ltd.)
*2N,N'-dicyclohexyl-2-benzothiazylsulfeneamide (trade name: Nocceler DZ manufactured by Ouchi Shinko Chemical Industrial Co., Ltd.)
*3N-cyclohexyl-2-benzothiazylsulfeneamide (trade name: Nocceler CZ manufactured by Ouchi Shinko Chemical Industrial Co., Ltd.)
*4trade name: Manobond C22.5, cobalt content: 22.5% by mass, manufactured by OMG Corporation
*5N-methyl-N-t-butylbenzothiazole-2-sulfeneamide
*6N-ethyl-N-t-butylbenzothiazole-2-sulfeneamide
*7N-n-propyl-N-t-butylbenzothiazole-2-sulfeneamide
*8N-i-propyl-N-t-butylbenzothiazole-2-sulfeneamide
*9N,N-di-i-propylbenzothiazole-2-sulfeneamide
*10N-n-butyl-N-t-butylbenzothiazole-2-sulfeneamide As apparent from the results shown in Table, it has been found that the rubber-steel cord composites prepared in Examples 1 to 4 falling in the scope of the present invention are excellent in workability from the evaluations of the Mooney viscosity and the Mooney scorch time and that they are markedly excellent in tensile characteristics, an adhesive property after vulcanized for a short time and a heat resistant adhesive property.

In contrast with this, it has been found that the rubber-steel cord composites prepared in Comparative Examples 1 to 8 falling outside the scope of the present invention can not exert the effects of the present invention and that in Comparative Examples 9 and 12, the rubber-steel cord composites prepared by using the rubber compositions containing the vulcanization accelerators having a combination in which both of $R^1$ and $R^2$ are branched alkyl groups in Comparative Examples 9 and 10 and the rubber-steel cord composites prepared by using the rubber compositions containing the conventional vulcanization accelerators (DCBS and CBS) in Comparative Examples 11 and 12 can not exert the effects of the present invention even when used was the steel cord in which a content of phosphorus contained in the form of oxide in a wire surface layer region extending from a surface of the brass-plated layer up to a depth of 5 nm in a wire radial direction toward the inside was 1.5 atomic % or less falling in the scope of the present invention.

INDUSTRIAL APPLICABILITY

The rubber-steel cord composites of the present invention can suitably be applied to rubber products in which direct vulcanization bonding between rubber and a steel cord is carried out in rubber products having a large thickness such as tires for passenger cars, trucks, buses, two-wheel vehicles and belt conveyors.

The invention claimed is:

1. A rubber-steel cord composite characterized in that a steel cord which has a brass-plated layer on a peripheral surface thereof and in which a content of phosphorus contained in the form of oxide in a wire surface layer region extending from a surface of the brass-plated layer up to a depth of 5 nm in a wire radial direction toward the inside is 1.5 atomic % or less is adjacent to a rubber composition containing a rubber component comprising 50% by mass or more of natural rubber, 0.3 to 10 parts by mass of sulfur, 0.03 to 3 parts by mass of a cobalt salt of organic acid in terms of a cobalt amount and 0.1 to 10 parts by mass of a sulfenamide base vulcanization accelerator represented by the following Formula (I) based on 100 parts by mass of the rubber component:

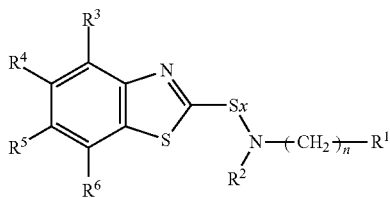 (I)

wherein $R^1$ is a branched alkyl group having 3 to 12 carbon atoms; $R^2$ is a linear alkyl group having 1 to 10 carbon atoms; $R^3$ to $R^6$ are a hydrogen atom, a linear alkyl group or alkoxy group having 1 to 4 carbon atoms or a branched alkyl group or alkoxy group having 3 to 4 carbon atoms, and they may be the same or different; x is an integer of 1 or 2, and n is an integer of 0 or 1.

2. The rubber-steel cord composite as described in claim 1, wherein a proportion of copper to the total amount of copper and zinc in the whole brass-plated layer is 60 to 70% by mass; and a proportion of copper to the total amount of copper and zinc in the wire surface layer region is 15 to 45 atomic %.

3. The rubber-steel cord composite as described in claim 1, wherein an average thickness of the brass-plated layer is 0.13 to 0.30 μm.

4. The rubber-steel cord composite as described in claim 1, wherein the steel cord is a single wire of a steel wire or prepared by twisting plural wirers of the steel wire.

5. The rubber-steel cord composite as described in claim 4, wherein a diameter of the steel wire is 0.40 mm or less.

6. The rubber-steel cord composite as described in claim 1, wherein $R^3$ to $R^6$ in Formula (I) are each a hydrogen atom.

7. The rubber-steel cord composite as described in claim 1, wherein in Formula (I), $R^1$ is tert-butyl; n is 0; and $R^2$ is methyl, ethyl or n-propyl.

8. The rubber-steel cord composite as described in claim 1, wherein in Formula (I), $R^1$ is tert-butyl; n is 0, and x is 1; and $R^2$ is methyl, ethyl or n-propyl.

9. The rubber-steel cord composite as described in claim 1, wherein the rubber component comprises 50% by mass or more of the natural rubber and the balance of a synthetic rubber.

* * * * *